United States Patent
Lassila

(10) Patent No.: US 9,592,747 B2
(45) Date of Patent: Mar. 14, 2017

(54) METHOD AND SYSTEM FOR CONTROLLING THE POWERTRAIN OF A VEHICLE

(71) Applicant: BAE Systems Hägglunds Aktiebolag, Örnsköldsvik (SE)

(72) Inventor: Viktor Lassila, Arnäsvall (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

(21) Appl. No.: 14/893,422

(22) PCT Filed: May 22, 2014

(86) PCT No.: PCT/SE2014/050628
§ 371 (c)(1),
(2) Date: Nov. 23, 2015

(87) PCT Pub. No.: WO2014/189459
PCT Pub. Date: Nov. 27, 2014

(65) Prior Publication Data
US 2016/0121753 A1    May 5, 2016

(30) Foreign Application Priority Data
May 24, 2013   (SE) .................................... 1350635

(51) Int. Cl.
*G06F 17/00*    (2006.01)
*B60L 15/20*    (2006.01)
(Continued)

(52) U.S. Cl.
CPC ............... *B60L 15/20* (2013.01); *B60K 6/26* (2013.01); *B60K 6/46* (2013.01); *B60K 6/52* (2013.01);
(Continued)

(58) Field of Classification Search
CPC ......... B60L 15/20; B60L 11/12; B60W 10/10; B60W 2710/081; B60W 2510/081;
(Continued)

(56) References Cited

U.S. PATENT DOCUMENTS 8,618,752 B2 * 12/2013 Zing .................. B60L 15/2045
180/65.22
9,376,006 B2 * 6/2016 Terayama ........... B60W 20/102
(Continued)

FOREIGN PATENT DOCUMENTS

DE    102011084858 A1    4/2013
EP    2581258 A1    4/2013

OTHER PUBLICATIONS

International Search Report and Written Opinion received for PCT Application No. PCT/SE2014/050628, mailed on Aug. 27, 2014, 9 pages.

(Continued)

*Primary Examiner* — McDieunel Marc
(74) *Attorney, Agent, or Firm* — Morrison & Foerster LLP

(57) ABSTRACT

The disclosure relates to a method for controlling the powertrain of a vehicle, which powertrain comprises a first electric drive device for driving of a first drive shaft and a second electric drive device for driving of a second drive shaft of the vehicle, comprising the step of via power electronics providing electricity supply of a first electric motor of the first electric drive device and a second electric motor of the second electric drive device, comprising the step of providing said electricity supply from a common power electronics which supplies said first and second electric motors with electricity, which motors hereby are connected in parallel. The disclosure also relates to a system for controlling the powertrain of a vehicle. The present invention also relates to a motor vehicle. The present inven- (Continued)

tion also relates to a computer program and a computer program product.

23 Claims, 6 Drawing Sheets

(51) Int. Cl.
*B60K 6/46* (2007.10)
*B60K 6/52* (2007.10)
*B60W 10/08* (2006.01)
*B60W 20/00* (2016.01)
*B60K 6/26* (2007.10)
*B60L 11/08* (2006.01)
*B60L 11/12* (2006.01)

(52) U.S. Cl.
CPC ............... *B60L 11/08* (2013.01); *B60L 11/12* (2013.01); *B60W 10/08* (2013.01); *B60W 20/00* (2013.01); *B60W 20/10* (2013.01); *B60W 2510/08* (2013.01); *B60W 2510/081* (2013.01); *B60W 2710/081* (2013.01); *B60Y 2200/92* (2013.01); *Y02T 10/6217* (2013.01); *Y02T 10/6265* (2013.01); *Y10S 903/906* (2013.01)

(58) Field of Classification Search
CPC ...... B60K 11/08; B60K 6/26; B60Y 2200/92; Y10S 903/906
USPC .......................................................... 701/22
See application file for complete search history.

(56) References Cited

U.S. PATENT DOCUMENTS

| | | | | |
|---|---|---|---|---|
| 2005/0279546 | A1* | 12/2005 | Tabata | B60K 6/445 180/65.235 |
| 2007/0142152 | A1* | 6/2007 | Holmes | B60K 6/445 475/2 |
| 2010/0004090 | A1 | 1/2010 | Mizutani et al. | |
| 2011/0172863 | A1 | 7/2011 | Yu et al. | |
| 2012/0049771 | A1* | 3/2012 | Komatsu | B60K 6/442 318/139 |

OTHER PUBLICATIONS

International Preliminary Report on Patentability received for PCT Patent Application No. PCT/SE2014/050628, mailed on Dec. 3, 2015, 6 pages.

* cited by examiner

METHOD AND SYSTEM FOR CONTROLLING THE POWERTRAIN OF A VEHICLE

CROSS REFERENCE TO RELATED APPLICATIONS

This application is a U.S. National Stage patent application of PCT/SE2014/050628, filed on May 22, 2014, which claims priority to Swedish Patent Application No. 1350635-7, filed on May 24, 2013, the entire contents of which are incorporated herein by reference.

FIELD OF THE INVENTION

The invention relates to a method for controlling the powertrain of a vehicle. The invention also relates to a system for controlling the powertrain of a vehicle. The invention also relates to a motor vehicle. The invention also relates to a computer program and a computer program product.

BACKGROUND OF THE INVENTION

Vehicles with powertrains with multiple drive shafts where the respective drive shaft is driven by means of an electric drive device, where the axles lacks mechanical connection to each other are traditionally arranged to be electrically supplied via power electronics, the electric motor of the respective driving axle being supplied with a separate power electronics, where each driving axle is arranged to be controlled individually. Differences in speed between the shafts are handled by a superior control sending signals to the individually controlled shafts.

The fact that the shafts are not mechanically connected to each other implies in certain cases that the electric motors and the power electronics need to be increased in dimension. On a two-shaft loading vehicle where one shaft is in the air, the shaft being on the ground needs to be able to deliver the maximal driving power of the vehicle.

US2010133023 and WO2011138308 show examples of powertrains of vehicles where a common superior power electronic box controls electric motors of drive devices of drive shafts, where the power electronic box comprises double power electronic units where one power electronic unit is arranged to electrically supply an electric motor of a drive shaft with power electronics and another power electronic unit being arranged to electrically supply an electric motor of another drive shaft with power electronics.

SUMMARY OF THE INVENTION

An object of the present invention is to provide a method for controlling of the powertrain of a vehicle which is cost efficient and in a space saving way facilitates efficient propulsion of the vehicle.

An object of the present invention is to provide a system for controlling of the powertrain of a vehicle which is cost efficient and in a space saving way facilitates efficient propulsion of the vehicle.

These and other objects, apparent from the following description, are achieved by a method, a device, a vehicle and a computer program and a computer program product which are of the type stated by way of introduction and which in addition exhibits the features recited below. Preferred embodiments of the method and device are defined in below.

According to the invention the objects are achieved with a method for controlling the powertrain of a vehicle, which powertrain comprises a first electric drive device for driving of a first drive shaft with two first ground engaging members and a second electric drive device for driving of a second drive shaft with two second ground engaging members of the vehicle, comprising the step of via power electronics providing electricity supply of a first electric motor of the first electric drive device and a second electric motor of the second electric drive device, further comprising the step of providing said electricity supply from a common power electronics which supplies said first and second electric motors with electricity, which motors hereby are connected in parallel. Hereby the same tractive force demands of the drive shafts are achieved as of a powertrain where the electricity supply to the respective motor is effected with two different power electronics. By electricity supply from a common power electronics space savings are further facilitated in that a power electronic unit for such common electricity supply can be made more compact. Further the torque will, through such common electricity supply, be moved to the drive shaft whose ground engaging members have grip wherein difference in speed between the shafts is mainly prevented and traction control is effected automatically without the need of superior control. Further such common power electronics instead of separate power electronics for the respective electric motor results in cost savings.

According to an embodiment of the method said electric motors are driven from the same output stage from said common power electronics. By e.g. a three-phase connection to the electric motors connected in parallel the electric motors will be driven from the same output stage, one output stage per phase. According to alternative variants the electric motors have more than three phases, wherein correspondingly the electric motor will be driven from the same output stage, one output stage per phase.

According to an embodiment of the method a generator for electric generation for said electricity supply is driven by means of a combustion engine of said powertrain. Hereby efficient generation for said electricity supply is facilitated.

According to an embodiment of the method said electricity supply is effected from an energy storage unit via said common power electronics. Hereby efficient electricity supply is facilitated.

According to an embodiment of the method said first and second electric motors are constituted by an alternating current motor.

According to an embodiment of the method said alternating current motors are constituted by asynchronous motors. Hereby the control of the electric motors connected in parallel is facilitated as asynchronous motors are not position dependent. By the use of asynchronous motors control of the speed of the electric motors based on the slip.

According to an embodiment the method comprises the step of determining the speed of said electric motors and the step of controlling the speed of said electric motors based on the speed of the electric motor showing the lowest speed. Hereby the control of the electric motor consuming most power is optimized, i.e. the control is focused on the electric motor working the hardest. Hereby propulsion is improved.

According to an embodiment the method comprises the step of determining the speed of said electric motors and the step of controlling the speed of said electric motors based on the slip of the electric motor showing the greatest slip. Hereby the control of the electric motor consuming most power is optimized, i.e. the control is focused on the electric motor working the hardest. Hereby propulsion is improved.

According to an embodiment of the method said first and second drive shaft lack mutual mechanical connection.

According to the invention the objects are achieved with a system for controlling the powertrain of a vehicle, which powertrain comprises a first electric drive device for driving of a first drive shaft with two first ground engaging members and a second electric drive device for driving of a second drive shaft with two first ground engaging members of the vehicle, and further comprising power electronics arranged to provide electricity supply of a first electric motor of the first electric drive device and a second electric motor of the second electric drive device, comprising a common power electronics arranged to provide said electricity supply of said first and second electric motors, which motors hereby are connected in parallel. Hereby the same tractive force demands of the drive shafts are achieved as of a powertrain where the electricity supply to the respective motor is effected with two different power electronics. By electricity supply from a common power electronics space savings are further facilitated in that a power electronic unit for such common electricity supply can be made more compact. Further the torque will, through such common electricity supply, be moved to the drive shaft whose ground engaging member have grip wherein difference in speed between the shafts is mainly prevented and traction control is effected automatically without the need of superior control. Further such common power electronics instead of separate power electronics for the respective electric motor results in cost savings. The system hereby becomes less complex.

According to an embodiment of the system said electric motors are arranged to be driven from the same output stage from said common power electronics. By e.g. a three-phase connection to the electric motors connected in parallel the electric motors will be driven from the same output stage, one output stage per phase. According to alternative variants the electric motors have more than three phases, wherein correspondingly the electric motor will be driven from the same output stage, one output stage per phase.

According to an embodiment of the system the powertrain further comprises a combustion engine arranged to drive a generator for electric generation for said electricity supply. Hereby efficient generation for said electricity supply is facilitated.

According to an embodiment of the system the powertrain comprises an energy storage unit, wherein said electricity supply is arranged to be effected from said energy storage unit via said common power electronics. Hereby efficient electricity supply is facilitated.

According to an embodiment of the system said first and second electric motors are constituted by an alternating current motor.

According to an embodiment of the system said alternating current motors are constituted by asynchronous motors. Hereby the control of the electric motors connected in parallel is facilitated as asynchronous motors are not position dependent. By the use of asynchronous motors control of the speed of the electric motors based on the slip.

According to an embodiment the system comprises means for determining the speed of said electric motors and means for controlling the speed of said electric motors based on the speed of the electric motor showing the lowest speed. Hereby the control of the electric motor consuming most power is optimized, i.e. the control is focused on the electric motor working the hardest. Hereby propulsion is improved.

According to an embodiment the system comprises means for determining the speed of said electric motors and means for controlling the speed of said electric motors based on the slip of the electric motor showing the greatest slip. Hereby the control of the electric motor consuming most power is optimized, i.e. the control is focused on the electric motor working the hardest. Hereby propulsion is improved.

According to an embodiment of the system said first and second drive shaft lack mutual mechanical connection.

The invention also relates to a vehicle comprising a system according to any of the embodiments above. According to an embodiment said vehicle is constituted by a vehicle controllably arranged for pivoting of the vehicle. According to an embodiment the vehicle is constituted by an articulated vehicle. According to a variant the steering point of the articulated vehicle is arranged such that the distance between the steering point and the first drive shaft is essentially the same as the distance between the steering point and the second drive shaft. Hereby road manners of the vehicle are improved in that the average speed of the first drive shaft will be essentially the same as the average speed of the second drive shaft even when the articulated vehicle is turning, wherein tensions in the system are avoided. The vehicle according to the present invention could also be constituted by a vehicle with steerable wheels where both front wheels and rear wheels are steerable, such as e.g. vehicle in container handling. The present invention would get essentially the same effect on such a vehicle with steerable front and rear wheels as in an articulated vehicle. The vehicle according to the present invention could also be constituted by a vehicle with steerable wheels only on the front shaft as a conventional car. The vehicle according to the present invention could also be constituted by a vehicle with steerable wheels only on the rear shaft as a forklift.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which.

DETAILED DESCRIPTION OF THE INVENTION

Hereinafter the term "link" refers to a communication link which may be a physical connector, such as an optoelectronic communication wire, or a non-physical connector such as a wireless connection, for example a radio or microwave link.

Hereinafter the term "power electronic unit" refers to a unit configured to provide electricity supply of an electric motor. The power electronic unit is consequently configured to supply an electric motor with electric energy. According to a variant such a power electronic unit is configured to convert continuous voltage/continuous current to alternating voltage/alternating current. According to a variant such a power electronic unit is configured to convert voltage up or down. According to a variant such a power electronic unit is configured to facilitate connection to an energy storage unit such as battery, capacitor or the corresponding. According to a variant such a power electronic unit is configured to control speed of electric motors.

Hereinafter the term "output stage" refers to the part of the power electronics converting the continuous voltage to alternating voltage including the circuits hereby being included.

When the description discusses a drive shaft with two ground engaging members it is here intended that one of the ground engaging members is not controlled differently than the other ground engaging member. If the two ground engaging members are for example a right and a left wheels on a vehicle it is intended that the right wheel is not controlled independently or in another way than the left wheel.

In an example one ground engaging member comprises several wheels. For example in heavy vehicles several wheels may be arranged on one side of a drive shaft and constitute a ground engaging member there while several wheels also may be arranged on the other side of the drive shaft and also constitute a ground engaging member there. With a ground engaging member is thus here and in the entire document intended at least one ground engaging element.

When coupling in parallel of electric motors are discussed in the description it is intended that these electric motors in principal always are coupled in parallel, i.e. that no switches need to be provided in order to during certain driving conditions disconnect one or more of these electric motors for propulsion.

Figure 1:
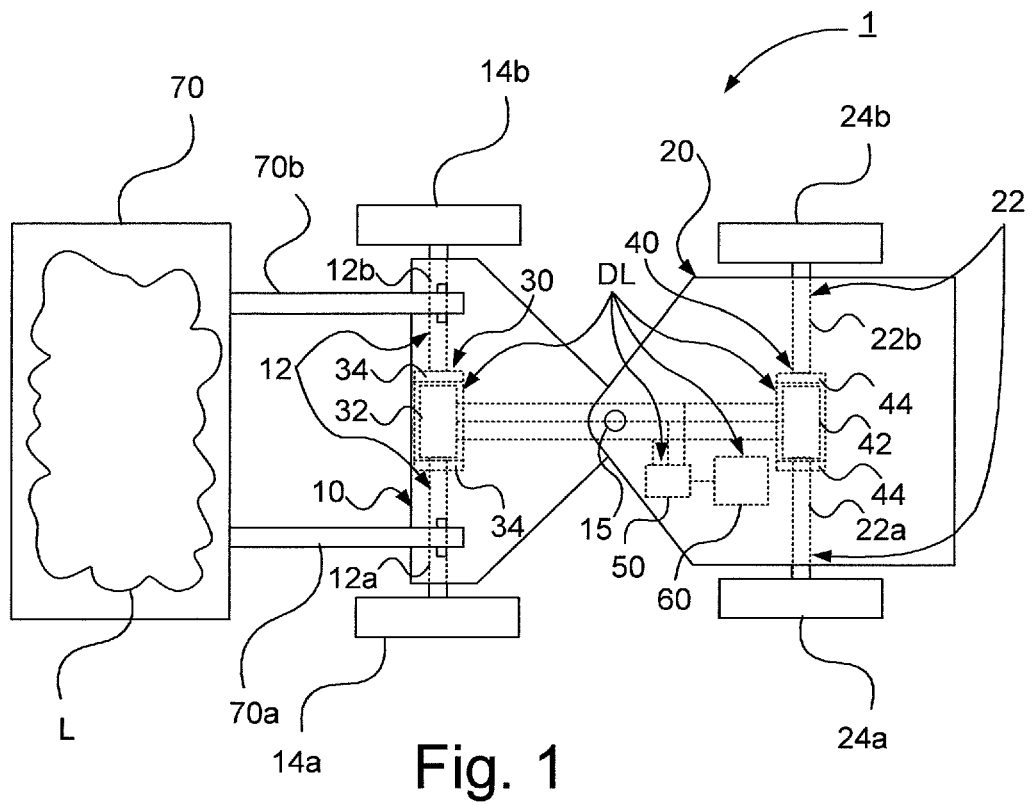
FIG. 1 schematically illustrates a plan view of an articulated multi-shaft-driven motor vehicle according to an embodiment of the present invention.
Figure 2:
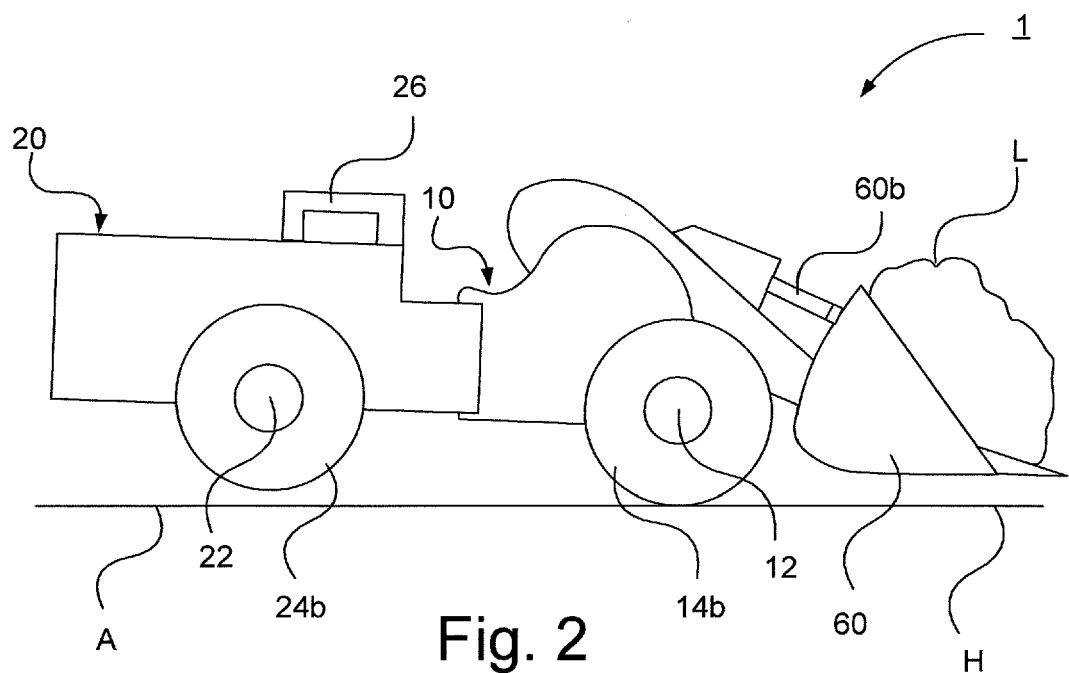
FIG. 2 schematically illustrates a side view of the vehicle in FIG. 1.

FIG. 1-2 schematically illustrate different view of a motor vehicle 1 according to the present invention. The motor vehicle 1 is according to this embodiment constituted by a work vehicle. The motor vehicle 1 is according to this embodiment constituted by an articulated vehicle. The motor vehicle 1 is constituted by a multi-shaft-driven vehicle.

The articulated vehicle 1 has a front vehicle unit 10 and a rear vehicle unit 20. The front and rear vehicle units 10, 20 are pivotable about a steering device 15 by means of which the vehicle 1 is arranged to be steered.

The articulated vehicle 1 comprises a powertrain DL for driving of the vehicle 1.

The powertrain DL comprises a first electric drive device 30 arranged in the front vehicle unit 10 for driving of a first drive shaft 12 constituting the front drive shaft 12 and a second electric drive device 40 arranged in the rear vehicle unit for driving of a second drive shaft 22 constituting the rear drive shaft 22 of the vehicle. Said front and rear drive shafts 12, 22 lack mechanical mutual connection.

The front vehicle unit 10 comprises the front drive shaft 12. The front drive shaft 12 is connected to ground engaging members 14a, 14b in the form a front drive wheels. The rear vehicle unit 20 comprises the rear drive shaft 22. The rear drive shaft 22 is connected to rear ground engaging members 24a, 24b in the form of rear drive wheels.

The front drive shaft 12 comprises a left drive shaft portion 12 and a right drive shaft portion 12b. Said front drive wheels 14 comprising a front left drive wheel 14a connected to left drive shaft portion 12a and an opposite front right drive wheel 14b connected to the right drive shaft portion 12b.

The first electric drive device 30 comprises a first electric motor 32 for driving the front drive shaft 12. The first electric drive device further comprises a front transmission configuration 34. The front transmission configuration 34 comprises according to a variant a front left transmission unit and a front right transmission unit. The front transmission configuration 34 comprises a front differential device which may be constituted by any suitable differential for providing a differential function.

The front differential device is according to an embodiment arranged superposed and connected to said front left transmission unit and front right transmission unit for providing said differential function.

The front differential device of the front transmission configuration 34 is connected to the front drive shaft 12 in such a way that drive torque is transferred from the front differential device via the respective front drive shaft portion 12a, 12b to the respective front drive wheels 14a, 14b.

The rear drive shaft 22 comprises a left drive shaft portion 22a and a right drive shaft portion 22b. Said rear drive wheels 14 comprise a rear left drive wheel 14a connected to the left drive shaft portion 22a and an opposite rear right drive shaft 14b connected to the right drive shaft portion 22b.

The second electric drive device 40 comprises a second electric motor 42 for driving of the rear drive shaft 22. The second electric drive device 40 further comprises a rear transmission configuration 44. The rear transmission configuration 44 comprises according to a variant a rear left transmission unit and a rear right transmission unit. The rear transmission configuration 44 comprises a rear differential device which may be constituted by any suitable differential for providing a differential function.

The rear differential device of the rear transmission configuration 44 is according to an embodiment arranged superposed and connected to said rear left transmission unit and rear right transmission unit for providing said differential function.

The rear differential device 46 is connected to the rear drive shaft 22 in such a way that the drive torque is transferred from the rear differential device 46 via the respective rear drive shaft portion 22a, 22b to the respective rear drive wheel 14a, 14b.

The rear vehicle unit 20 of the articulated vehicle 1 has according to this embodiment a cabin 26.

The first electric motor 32 of the first electric drive device 30 is coupled in parallel with the second electric motor 42 of the second electric drive device 40. Said first and second electric motors 32, 42 are constituted by asynchronous motors.

The powertrain further comprises a power electronic unit 50 arranged, by means of power electronics, to provide electricity supply of the firsts electric motor of the first electric drive device and the second electric motor of the second electric drive device.

The powertrain further comprises energy storage means 60 for generating of electricity for said electricity supply.

Said power electronic unit 50 is connected to said first and second electric motors 32, 42 such that a common power electronic provides said electricity supply of said first and second electric motor 32, 42 coupled in parallel, where said electric motors 32, 42 are driven from the same output stage from said common power electronics.

Hereby the torque will all the time move to the drive shaft 12, 22 which drive wheels have grip wherein difference in speed between the shaft is essentially prevented and traction control will automatically function as traction, without need of superior control.

Hereby the main part of the current will automatically go to the drive shaft having grip whether you like it or not since that what controls how much current the motor consumes is the slip of the rotor of the electric motor 32, 42 and the slip of the electric motor 32, 42 is controlled by the torque output.

The articulated vehicle 1 comprises a dredger ladle connected to the front vehicle unit 10 via lifting arms 70a, 70b arranged to receive and remove load L, where the load L may be constituted by any load such as gravel, stone, sand, gods or the corresponding. Said lifting arms 70a, 70b are arranged to lift and lower the dredger ladle 70 and also comprises according to a variant means for turning the dredger ladle 70 for receiving and removing of load L.

The power electronics 50 is comprised in a system for controlling the powertrain of the vehicle. The system comprises an electronic control unit for said control. According to a variant said electronic control unit is comprised by the power electronic unit 50.

FIG. 2 schematically illustrates a side view of the articulated vehicle in FIG. 1 where the rear drive wheels 14a, 14b have ended up in the air during a load operation phase. Due to the fact that the first and second electric motors 32, 42 are coupled in parallel and arranged to be driven from the same output stage from a common power electronics of the power electronic unit 50, where the common power electronics is arranged to provide electricity supply of the first and second electric motors 32, 42, the firsts and second electric motors 32, 42 will run with essentially the same speed, i.e. the rotor of the first and second electric motors 32, 42 will rotate with essentially the same rotational speed.

The power will, apart from internal losses of the rear drive shaft 22, the wheels 24a, 24b of which are in the air, go into the front drive shaft 12, the wheels 14a, 14b of which have ground contact. Hereby the vehicle 1 will obtain essentially maximum traction force with only one of the electric motors 32, 42 thus connected to the power electronic unit 50.

The second electric motor 42 of the rear drive shaft 22 will in this case, where the rear wheels 24a, 24b are in the air, run with a given speed but will not transfer any torque apart from its own inner resistance, which will result in the other electric motor 42 not consuming any current for propulsion of the vehicle wherein thus essentially all current is available for driving the front drive shaft 12, the wheels 14a, 14b of which have ground contact. This will hereby be effected automatically.

Since the first and second electric motors 32, 42 are coupled in parallel and interconnected to the same power electronics of the power electronic unit 50 the first and second electric motor 32, 42 will as mentioned also run with essentially the same speed, which consequently means that automatic traction control function is obtained since the drive shafts 12, 22 hereby are not allowed to spin individually.

Since the torque is moved all the time to the shaft having grip the system will automatically function as traction control and difference in speed between the shaft will essentially be prevented, without the need of superior control. Essentially all current will automatically go to the shaft having grip whether you want it or not since what is controlling how much current the motor consumes is the slip of the rotor and the slip is controlled by the torque that is taken out. In the extreme case if you lift the rear wheel such that it is in the air it cannot transfer any torque more than its own inner resistance. No torque means that it does not draw any current which means that all current is available for the front shaft. This will be effected totally automatically and since they are linked together on the same electronics they will also run with essentially the same speed, and then a traction control function is automatically obtained since the shafts cannot spin individually.

Figure 3:
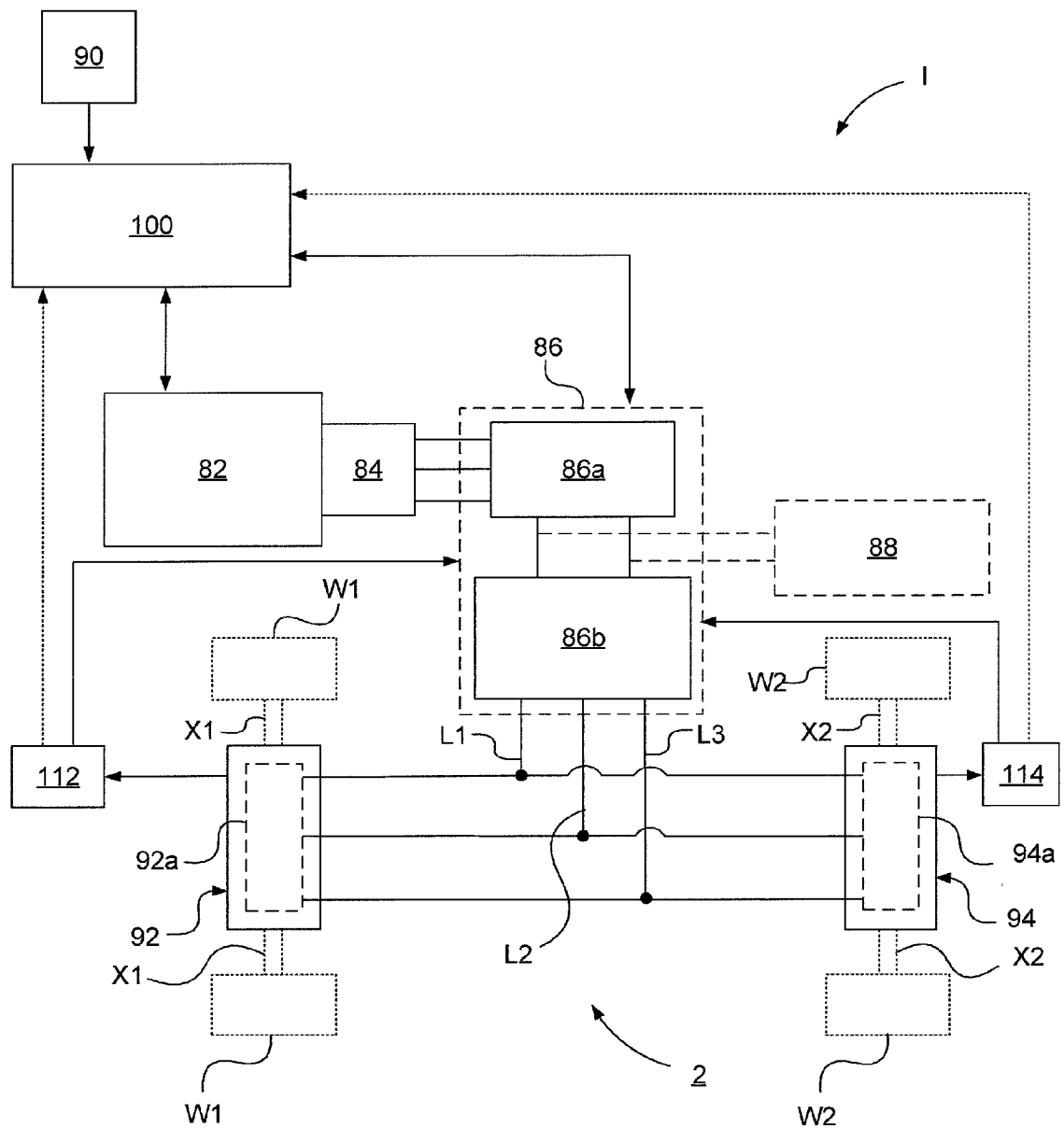
FIG. 3 schematically illustrates a vehicle with a system for controlling the powertrain of the vehicle according to an embodiment of the present invention.

FIG. 3 schematically illustrates a vehicle 2 with a system I for controlling the powertrain of the vehicle according to an embodiment of the present invention.

The vehicle has a first shaft configuration X1 with first ground engaging members W1 and a second shaft configuration X2 with second ground engaging members W2. The ground engaging members are according to a variant drive wheels. The ground engaging members are according to an alternative variant constituted by tracks. The ground engaging members are according to an alternative variant constituted by both tracks and wheels where one of the front and rear shaft configurations has ground engaging members in the form of wheels and the other shaft configuration has ground engaging members in the form of tracks.

The system I comprises a powertrain for propulsion of a motor vehicle. The powertrain comprises a combustion engine unit 82, the combustion engine unit 82 according to a variant being constituted by a diesel engine. Hereby the powertrain is constituted by a diesel electric powertrain.

The powertrain further comprises a generator unit 84 connected to said combustion engine unit 82. Said combustion engine unit 82 is arranged to drive said generator unit 84 for generation of electric energy.

The powertrain further comprises a first drive device 92 with a first electric motor 92a and a second drive device 94 with a second electric motor 94a. The electric motors 92a, 94a are coupled in parallel.

The powertrain further comprises a power electronic unit 86 arranged to provide, by means of power electronics, electricity supply of the first electric motor 92a of the first electric drive device 92 and the second electric motor 94a of the second electric drive device 94.

Wherein said electric motors are driven from the same output stage from said common power electronics.

The power electronics comprises an AC/DC-transformation unit 86a connected to the generator unit 84 and configured to convert alternating voltage from the generator unit 84 to continuous voltage.

The power electronic unit further comprises a DC/AC-transformation unit 86b connected to the AC/DC-transformation unit 46a and configured to convert the continuous voltage to controllable alternating voltage.

Hereby a continuous voltage intermediate link is formed between said AC/DC-transformation unit 86a and said DC/AC-transformation unit 86b.

Said first and second electric motors 92a, 94a are configured for propulsion of a vehicle. Said first and second electric motor 92a, 94a are arranged to be supplied by means of said generated electric energy. Said firsts and second electric motors 92a, 94a are constituted by asynchronous motors.

The powertrain comprises according to an embodiment an energy storage device 88. Said energy storage device 88 comprises according to an embodiment one or more super capacitors. According to an alternative embodiment said energy storage device 88 comprises one or more battery units. According to an embodiment said energy storage device comprises both super capacitor and battery unit the powertrains comprises according to a variant a fuel cell for power transfer/energy supply for propulsion. According to a variant said energy storage unit comprises a fuel cell.

Said energy storage device 88 is according to this variant directly connected to the continuous voltage intermediate link. Said energy storage device 88 is arranged to store said generated energy from generator unit and during breaking converted kinetic energy, and charging at charging station or the corresponding.

The system further comprises an actuator 90 for power request, the actuator according to a variant comprising a gas giving unit 90, such as a gas pedal. Power request is generated on the basis of an executed act corresponding t a wish to give power to the vehicle for propulsion of the same. Said power request is according to a variant performed by the vehicle operator, according to a variant by the drive of the vehicle. The power request may also be effected automatically, by programmed in advance or the corresponding, such as in a vehicle without driver/autonomous vehicle. Power request of the actuator in the form of the gas giving unit 90 corresponds to a desired torque which form the basis for torque on DC/AC-transformation unit 86*b* and thereby the first and second electric motor 92*a*, 94*a*.

The system I further comprises means for controlling the powertrain. Said means comprises at least one electronic unit 100 for controlling the powertrain.

The electronic unit 100 is signal connected to said gas giving unit 90 via a link. The electronic control unit 100 is arranged to receive a signal from said gas giving unit 90 representing gas giving data for requested performance such as torque/power, said gas giving data comprising performance data such as torque data and/or power data.

The electronic control unit 100 is signal connected to said combustion engine unit 82 via a link. The electronic control unit 100 is arranged to send a signal to said combustion engine unit 82 representing performance data such as torque data and/or power data for requested torque from the gas giving unit 90.

The electronic control unit 100 is signal connected to said combustion engine unit 82 via a link. The electronic control unit 100 is arranged to receive a signal from said combustion engine unit 82 representing speed data and torque data of the combustion engine unit 82.

The electronic control unit 100 is signal connected to said power electronic unit 86 via a link. The electronic control unit 100 is arranged to send a signal to said power electronic unit 86 representing speed data and torque data for requested speed and torque.

The electronic control unit 100 is signal connected to said combustion engine unit 82 via a link. The electronic control unit 100 is arranged to receive a signal from said power electronic unit 86 representing speed data for the ground engaging members of the vehicle and torque data for requested torque from the gas giving unit 90.

Said power electronic unit 86 is connected to said first and second electric motors 92*a*, 94*a* such that a common power electronics provides said electricity supply of said first and second electric motors coupled in parallel, said electric motors 92*a*, 95*a* being driven from the same output stage from said common power electronics.

The first electric motor 92*a* is arranged to drive a first drive shaft configuration X1 connected to first ground engaging members W1, e.g. drive wheels.

The second electric motor 94*a* is arranged to drive a second drive shaft configuration X2 connected to second ground engaging members W2, e.g. drive wheels.

According to this embodiment said first and second electric motors 92*a*, 94*a* are coupled in parallel and connected to the power electronic unit 86, i.e. to the DC/AC transformation unit 86*b* of the power electronic unit 86 by means of a three phase connection. Hereby the electric motors 92*a*, 94*a* are coupled in parallel via a first phase L1 for a first output stage, a second phase L2 for a second output stage and a third phase L3 for an output stage from the common power electronic unit 86. By the three-phase connection to the electric motors 92*a*, 94*a* coupled in parallel the electric motors will consequently be driven with three output stages, one per phase L1, L2, L3.

Hereby the torque will all the time be moved to the drive shaft X1, X2 whose drive wheels W1, W2 have grip wherein difference in speed between the shafts is essentially prevented and the system will automatically function as traction, without the need of superior control.

All current will automatically go to the drive shaft W1, W2 having grip whether you want it or not since what controls how much current the electric motor will consume is the slip of the rotor of the electric motors 32, 42 and the slip of the electric motors 32, 42 is controlled by the torque output.

The system further comprises means for determining the speed of said electric motors 92*a*, 94*a*. Said means for determining speed is according to a variant constituted by a firsts speed sensor 112 arranged in connection to the first electric motor 92*a* and a second speed sensor 114 arranged in connection to the second electric motor 94*a*.

The inherent electronic control unit of the power electronic unit 86 is signal connected to the firsts speed sensor 112 via a link. The electronic unit of the power electronic unit 86 is arranged to receive a signal from the first speed sensor 112 representing speed data for speed of the electric motor 92*a*.

The inherent electronic control unit of the power electronic unit 86 is signal connected to the seconds speed sensor 114 via a link. The electronic unit of the power electronic unit 86 is arranged to receive a signal from the second speed sensor 114 representing speed data for speed of the electric motor 94*a*.

The electronic control unit of the power electronic unit is arranged to process said speed data in order to then control the speed of the electric motors 92*a*, 94*a* based on the electric motor showing the lowest speed/greatest slip.

According to an alternative variant the first speed sensor and the second speed sensor 114 are signal connected to the electronic control unit via links pointed in FIG. 3. According to this variant the electronic control unit 100 is signal connected to the first speed sensor 112 via a link. The electronic control unit 100 is arranged to receive a signal from the first speed sensor 112 representing speed data for speed of the electric motor 92*a*.

According to this variant the electronic control unit 100 is signal connected to the second speed sensor 114 via a link. The electronic control unit 100 is arranged to receive a signal from the second speed sensor 114 representing speed data for speed of the second electric motor 94*a*.

The electronic control unit 100 is according to this alternative variant arranged to process said speed data from the first speed sensor 112 and the second speed sensor 114 for determining slip of the first and second electric motors 92*a*, 94*a* and compare slip of the first and second electric motors 92, 94*a*. The electronic control unit 100 is according to a variant arranged to compare said speed data from the first speed sensor 112 and the second speed sensor 114.

The electronic control unit is hereby correspondingly arranged to send a signal to the power electronic unit 86 representing speed data and/or slip data for controlling the speed of the electric motors 92a, 94a based on the speed of the electric motor showing the lowest speed and/or controlling the speed of t the electric motors 92a, 94a based on the electric motor showing the greatest slip.

By the control according to above the control for the electric motor 92a, 94a consume the most power is optimized, i.e. the control is focused on the electric motor 92a, 94a working the hardest. Hereby the propulsion ability of the vehicle is improved. The control consequently is directed towards the electric motor having the most traction force. The control is optimized to the electric motor consuming most current, i.e. the electric motor transferring the most torque has the most optimized control.

Figure 4:
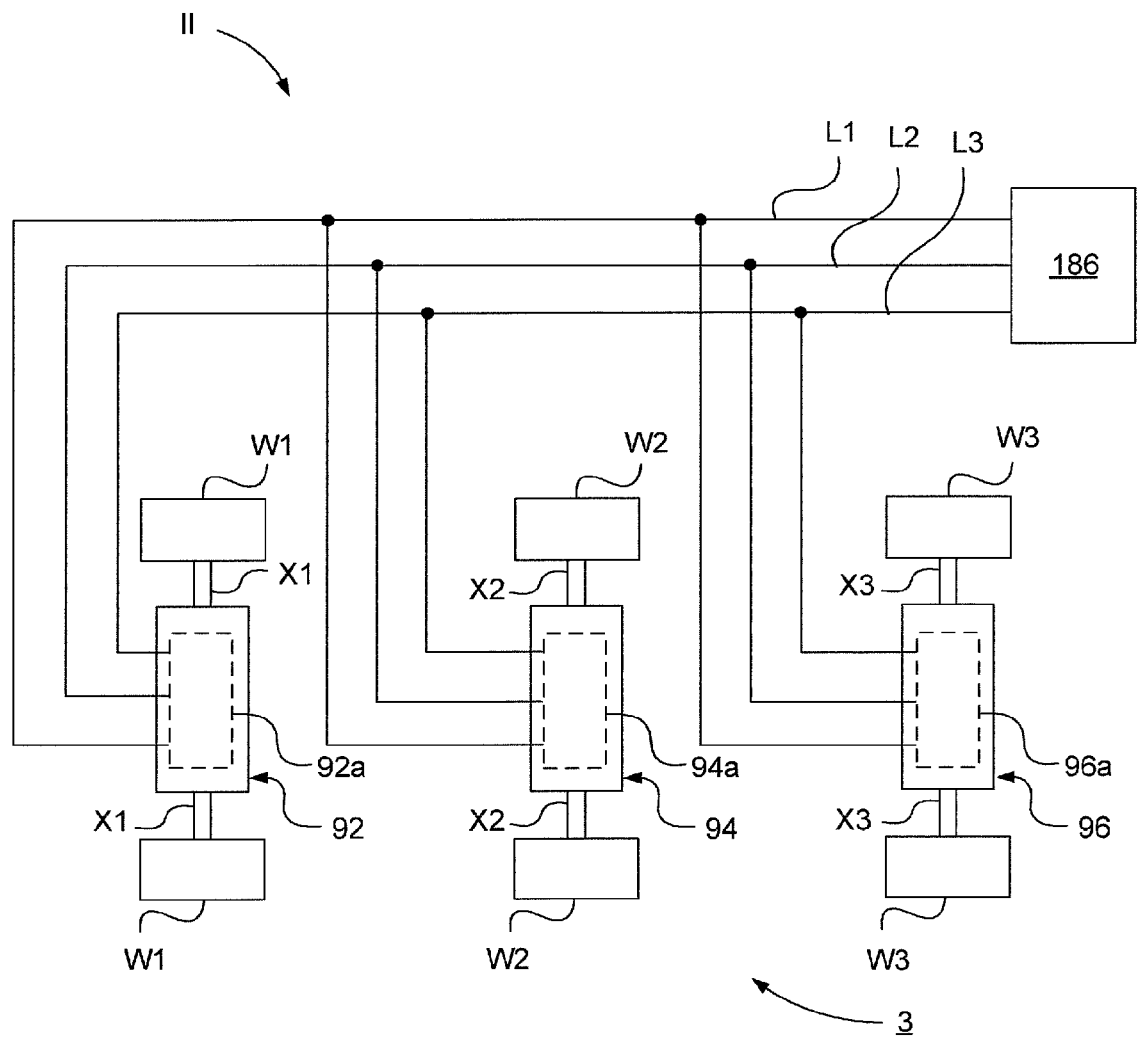
FIG. 4 schematically illustrates a block diagram of a system for controlling the powertrain of a vehicle according to an embodiment of the present invention.

FIG. 4 schematically illustrates a vehicle 3 with a system II for controlling the powertrain of the vehicle according to an embodiment of the present invention.

The vehicle according to FIG. 4 differs from the vehicle according to FIG. 3 in that the vehicle has the driven shaft configurations X1, X2, X3 not having any mechanical connection. The vehicle consequently has a first shaft configuration X1 with first ground engaging members W1, a second shaft configuration X2 with second ground engaging members W2 and a third shaft configuration X3 with third ground engaging members. The ground engaging members are according to a variant constituted by drive wheels.

The powertrain comprises a first drive device 92 with a first electric motor 92a, a second drive device 94 with a second electric motor 94 and a third drive device 96 with a third electric motor 96a.

The first electric motor 92a is arranged to drive a first drive shaft configuration X1 connected to first ground engaging members W1, for example drive wheels.

The second electric motor 94a is arranged to drive a second drive shaft configuration X2 connected to second ground engaging members W2, for example drive wheels.

The third electric motor 94a is arranged to drive a third drive shaft configuration X3 connected to third ground engaging members W3, for example drive wheels.

Said first, second and third electric motors 92a, 94a, 96a are coupled in parallel. The power electronic unit 186 is connected to said first, second and third electric motors 92a, 94a, 96a such that a common power electronics provides said electricity supply of said first, second and third electric motors 92a, 94a, 96a coupled in parallel, said electric motors 92a, 94a, 96a being drive from the same output stage from said common power electronics. The power electronic unit is connected to the electric motors via a three-phase connection with a first phase L1, a second phase L2 and a third phase L3.

Above vehicles with two or three drive shafts not mechanically connected have been described. The invention is also applicable on vehicles with more than three drive shafts not mechanically connected, where electric motors for the respective drive shaft is coupled in parallel as described above.

Above power electronic units connected to electric motors by means of three-phase connection have been described. Said connections may have any suitable number of phases such as on phase, two phases, or more than three phases.

Figure 5:
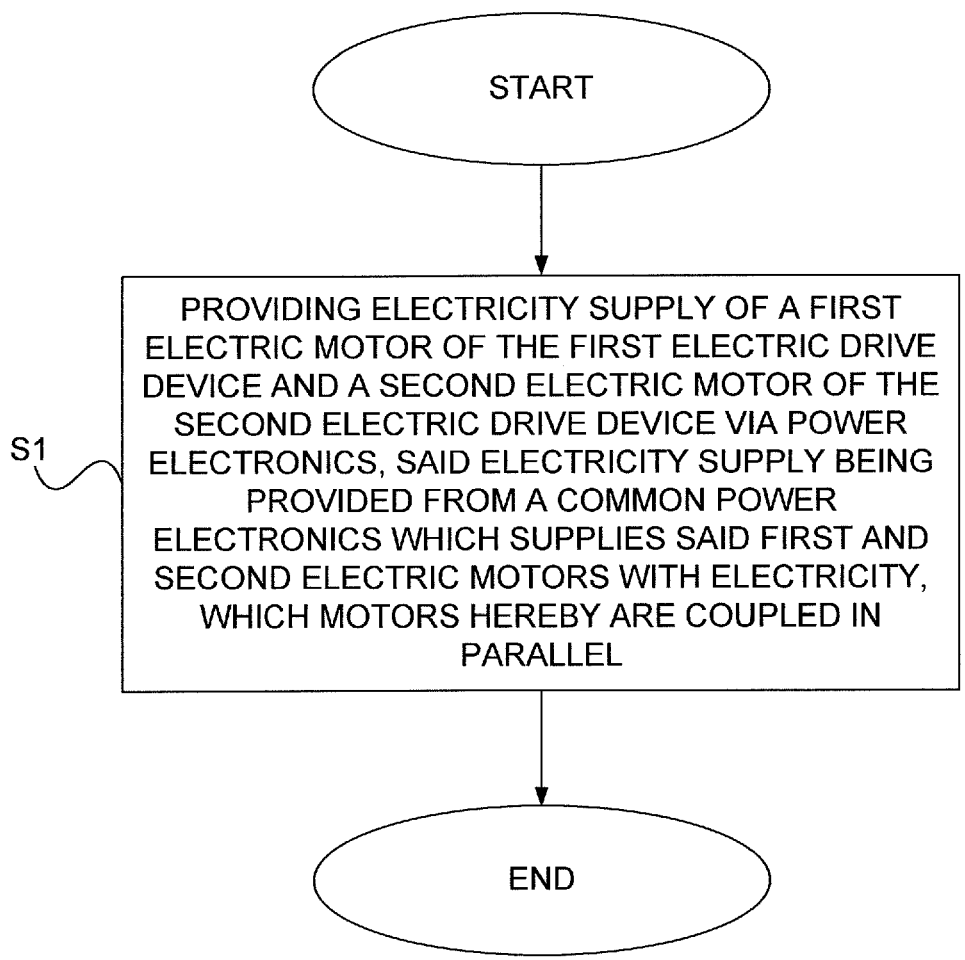
FIG. 5 schematically illustrates a block diagram of a method for controlling the powertrain o f a vehicle according to an embodiment of the present invention.

FIG. 5 schematically illustrates a block diagram of a method for controlling the powertrain of a vehicle according to an embodiment of the present invention, the powertrain comprising a first electric drive device for driving of a first drive shaft and a second electric drive device for driving of a second drive shaft of the vehicle.

According to an embodiment the method for controlling the powertrain of a vehicle comprises a first step S1. In this step electricity supply of a first electric motor of the first electric drive device and a second electric motor of the second electric drive device is provided via power electronics, said electricity supply being provided from a common power electronics which supplies said first and second electric motors with electricity, which motors hereby are coupled in parallel. The electric motors are hereby constituted by asynchronous motors.

Figure 6:
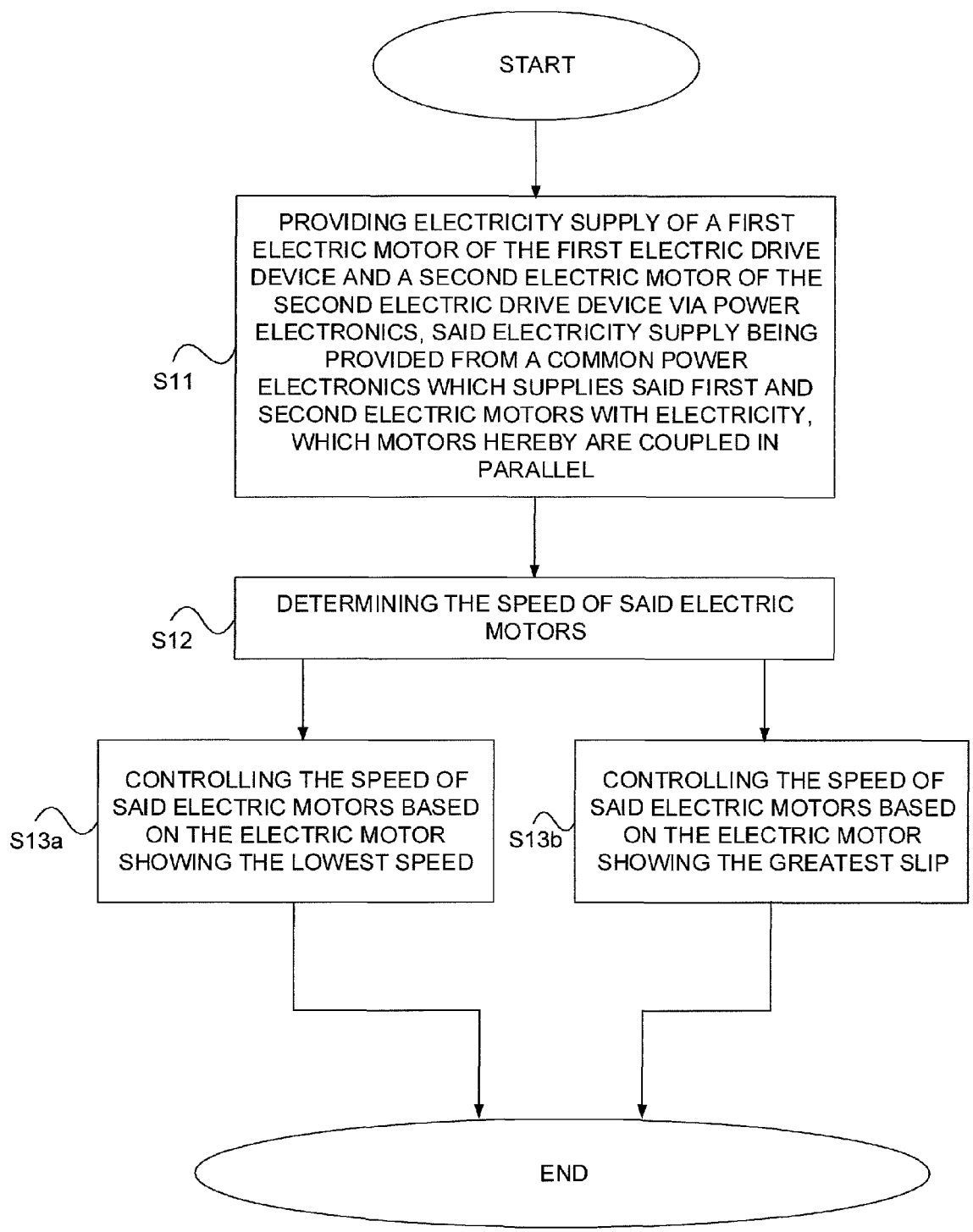
FIG. 6 schematically illustrates a block diagram of a method for controlling the powertrain of a driveline according to an embodiment of the present invention.

FIG. 6 schematically illustrates a block diagram of a method for controlling the powertrain of a vehicle according to an embodiment of the present invention, the powertrain comprising a first electric drive device for driving of a first drive shaft and a second electric drive device for driving of a second drive shaft of the vehicle.

According to an embodiment the method for controlling the powertrain comprises a first step S11. In this step electricity supply of a first electric motor of the first electric drive device and a second electric motor of the second electric drive device is provided via power electronics, said electricity supply being provided from a common power electronics which supplies said first and second electric motors with electricity, which motors hereby are coupled in parallel.

According to an embodiment the method for controlling the powertrain of a vehicle comprises a second step S12. In this step the speed of said electric motors is determined.

According to an embodiment the method for controlling the powertrain of a vehicle comprises a second step S13a. In this step the speed of said electric motors is controlled based on the speed of the electric motor showing the lowest speed.

According to an embodiment the method for controlling the powertrain of a vehicle comprises a second step S13b. In this step the speed of said electric motors is controlled based on the slip of the electric motor showing the greatest slip.

The electric motors are hereby constituted by asynchronous motors.

Figure 7:
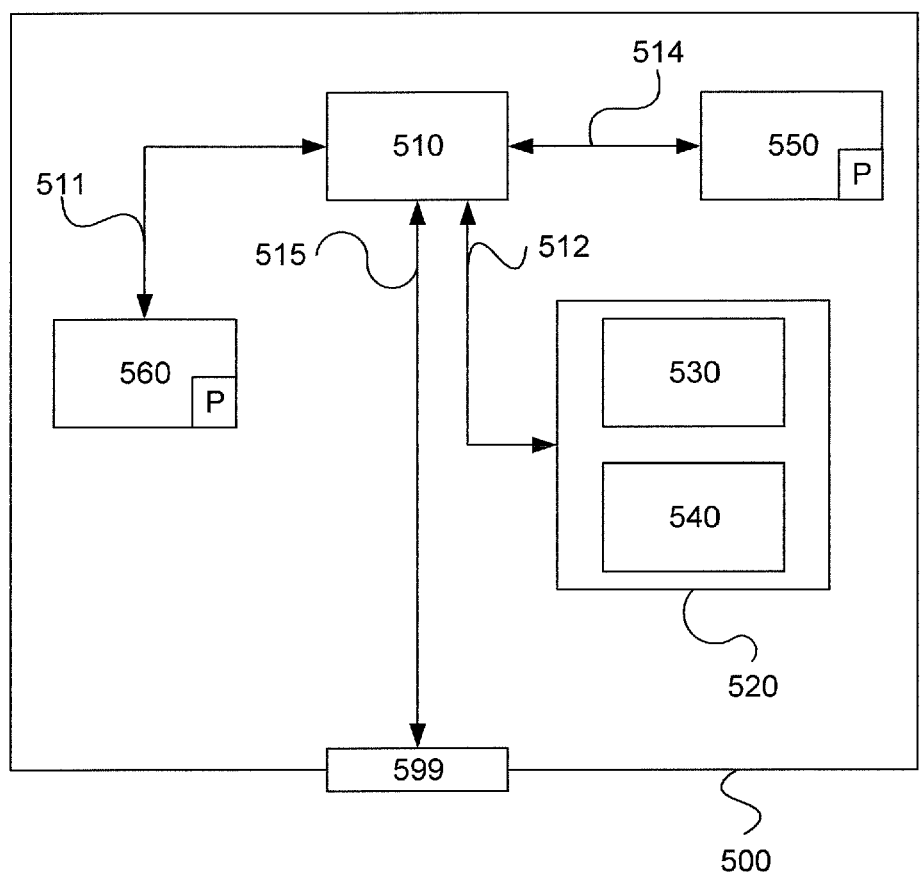
FIG. 7 schematically illustrates a computer according to an embodiment of the present invention.

With reference to FIG. 7, a diagram of an apparatus 500 is shown. The control unit 100 described with reference to FIG. 3 may according to an embodiment comprise apparatus 500. Apparatus 500 comprises a non-volatile memory 520, a data processing device 510 and a read/write memory 550. Non-volatile memory 520 has a first memory portion 530 wherein a computer program, such as an operating system, is stored for controlling the function of apparatus 500. Further, apparatus 500 comprises a bus controller, a serial communication port, I/O-means, an A/D-converter, a time date entry and transmission unit, an event counter and an interrupt controller (not shown). Non-volatile memory 520 also has a second memory portion 540.

A computer program P is provided comprising routines for controlling the powertrain of a vehicle according to the innovative method.

The program P comprises routines for providing electricity supply of a first electric motor of the first electric drive device and a second electric motor of the second electric drive device via power electronics, said electricity supply being provided from a common power electronics which supplies said first and second electric motors with electricity, which motors hereby are coupled in parallel.

The program P comprises according to an embodiment routines for determining the speed of said electric motors.

The program P comprises according to an embodiment routines for controlling the speed of said electric motors based on the electric motor showing the lowest speed.

The program P comprises according to an embodiment routines for controlling the speed of said electric motors based on the electric motor showing the greatest slip.

The program P may be stored in an executable manner or in a compressed condition in a separate memory 560 and/or in read/write memory 550.

When it is stated that data processing device 510 performs a certain function it should be understood that data processing device 510 performs a certain part of the program which is stored in separate memory 560, or a certain part of the program which is stored in read/write memory 550.

Data processing device 510 may communicate with a data communications port 599 by means of a data bus 515. Non-volatile memory 520 is adapted for communication with data processing device 510 via a data bus 512. Separate memory 560 is adapted for communication with data processing device 510 via a data bus 511. Read/write memory 550 is adapted for communication with data processing device 510 via a data bus 514. To the data communications port 599 e.g. the links connected to the control unit 100 may be connected.

When data is received on data port 599 it is temporarily stored in second memory portion 540. When the received input data has been temporarily stored, data processing device 510 is set up to perform execution of code in a manner described above.

The signals received on data port 599 can be used by apparatus 500 for providing electricity supply of a first electric motor of the first electric drive device and a second electric motor of the second electric drive device via power electronics, said electricity supply being provided from a common power electronics which supplies said first and second electric motors with electricity, which motors hereby are coupled in parallel.

The signals received on data port 599 can be used by apparatus 500 for determining the speed of said electric motors.

The signals received on data port 599 can be used by apparatus 500 for controlling the speed of said electric motors based on the electric motor showing the lowest speed.

The signals received on data port 599 can be used by apparatus 500 for controlling the speed of said electric motors based on the electric motor showing the greatest slip.

Parts of the methods described herein can be performed by apparatus 500 by means of data processing device 510 running the program stored in separate memory 560 or read/write memory 550. When apparatus 500 runs the program, parts of the methods described herein are executed.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for controlling the powertrain of a vehicle, the powertrain comprising a first electric drive device for driving of a first drive shaft with two first ground engaging members and a second electric drive device for driving of a second drive shaft with two second ground engaging members of the vehicle, the method comprising:
   providing electricity supply of a first electric motor of the first electric drive device and a second electric motor of the second electric drive device, wherein said electricity supply is provided from a common power electronics which supplies electricity to said first and second electric motors that are connected only in parallel.

2. The method of claim 1, wherein said electric motors are driven from the same output stage from said common power electronics.

3. The method of claim 1, wherein a generator for electric generation for said electricity supply is driven by means of a combustion engine of said powertrain.

4. The method of claim 1, wherein said electricity supply is effected from an energy storage unit via said common power electronics.

5. The method of claim 1, wherein said first and second electric motors are constituted by an alternating current motor.

6. The method of claim 5, wherein said alternating current motors are constituted by asynchronous motors.

7. The method of claim 1, comprising determining using a sensor the speed of said electric motors and controlling using a controller the speed of said electric motors based on the slip of the electric motor showing the lowest speed.

8. The method of claim 1, comprising determining using a sensor the speed of said electric motors and controlling using a controller the speed of said electric motors based on the slip of the electric motor showing the greatest slip.

9. The method of claim 1, wherein said first and second drive shaft lack mutual mechanical connection.

10. A system for controlling a powertrain of a vehicle, the powertrain comprising a first electric drive device for driving of a first drive shaft with two first ground engaging members and a second electric drive device for driving of a second drive shaft with two second ground engaging members of the vehicle, the system comprising:
    a common power electronics arranged to provide electricity to a first electric motor of the first electric drive shaft and a second electric motor of the second electric drive device such that said first and second electric motors are connected only in parallel.

11. The system of claim 10, wherein said electric motors are arranged to be driven from the same output stage from said common power electronics.

12. The system of claim 10, wherein the powertrain further comprises a combustion engine arranged to drive a generator for electric generation for said electricity supply.

13. The system of claim 10, wherein the powertrain comprises an energy storage unit, wherein said electricity supply is arranged to be effected from said energy storage unit via said common power electronics.

14. The system of claim 10, wherein said first and second electric motors are constituted by an alternating current motor.

15. The system Previously Presented of claim 14, wherein said alternating current motors are constituted by asynchronous motors.

16. The system of claim 10, comprising a sensor for determining the speed of said electric motors and a controller for controlling the speed of said electric motors based on the speed of the electric motor showing the lowest speed.

17. The system of claim 10, comprising a sensor for determining the speed of said electric motors and a controller for controlling the speed of said electric motors based on the slip of the electric motor showing the greatest slip.

18. The system of claim 10, wherein said first and second drive shaft lack mutual mechanical connection.

19. A vehicle comprising a system of claim 10.

20. The vehicle of claim 19, wherein said vehicle is constituted by a vehicle controllably arranged for pivoting of the vehicle.

21. The vehicle of claim 19, wherein said vehicle is constituted by an articulated vehicle.

22. A computer program, stored on a non-transitory storage medium, for controlling a powertrain of a vehicle, said computer program comprising program code which, when run on an electronic control unit or another computer connected to the electronic control unit, causes the electronic control unit to perform the method of claim 1.

23. A computer program product comprising the storage medium storing the computer program of claim 22.

* * * * *